United States Patent [19]

Green, deceased

[11] Patent Number: 4,476,928

[45] Date of Patent: Oct. 16, 1984

[54] METHOD AND APPARATUS FOR SOLVENT GENERATION AND RECOVERY OF HYDROCARBONS

[75] Inventor: William G. Green, deceased, late of Port Charlotte, Fla., by Melissa Jones, legal representative

[73] Assignee: Dimar Holding Corporation, Houston, Tex.

[21] Appl. No.: 401,312

[22] Filed: Jul. 23, 1982

[51] Int. Cl.³ .............................................. E21B 43/40
[52] U.S. Cl. ................................. 166/267; 166/75 R; 166/266; 210/767
[58] Field of Search .................. 166/52, 67, 75 R, 266, 166/267; 210/172, 218, 767

[56] References Cited

U.S. PATENT DOCUMENTS

| | | | |
|---|---|---|---|
| 1,567,183 | 12/1925 | Conrader | 166/267 |
| 2,202,657 | 5/1940 | Holt | 210/218 X |
| 2,413,102 | 12/1946 | Ebert et al. | 210/218 X |
| 2,595,979 | 5/1952 | Pevere et al. | 299/5 X |
| 3,526,276 | 9/1970 | Bennett et al. | 166/267 X |
| 3,945,435 | 3/1976 | Barry | 166/267 |
| 4,008,764 | 2/1977 | Allen | 166/266 |
| 4,231,867 | 11/1980 | Sutphin | 210/218 X |
| 4,323,122 | 4/1982 | Knopik | 166/267 |
| 4,333,831 | 6/1982 | Petzinger | 210/218 X |
| 4,376,702 | 3/1983 | Small | 210/218 X |

Primary Examiner—George A. Suchfield
Attorney, Agent, or Firm—Edmund M. Jaskiewicz

[57] ABSTRACT

A process is disclosed for the extraction and generation of solvent for continuous injection into a reservoir or subterranean deposit for the recovery of crude oil or liquified coal. Solvent contained in the recovered liquid mixture of organic compounds is vaporized by the bubbling and agitation of atmospheric air through a tank in which the recovered liquid mixture has been pumped. Various solvent compounds such as ethers or aromatic hydrocarbons are vaporized and drawn off from the tank by a suction pump or compressor and continuously reinjected into the deposit through an injection well. Apparatus in the form of a vertically disposed tube having an ambient atmospheric inlet is disposed within the solvent generator tank. Conventional storage tanks may be converted for the process by utilizing a telescoping tube arrangement which may be installed through a standard gaging or inspection port in the tank.

10 Claims, 2 Drawing Figures

4,476,928

METHOD AND APPARATUS FOR SOLVENT GENERATION AND RECOVERY OF HYDROCARBONS

BACKGROUND OF THE INVENTION

1. Field of the Invention

The present invention relates to the tertiary recovery of subterranean hydrocarbons using a solvent, more particularly, to a method and apparatus for the generation of a solvent by the recovery of ethers and other light ends from a liquid mixture of organic compounds recovered from a subterranean deposit.

2. Background Art

There has been increasing interest in maximizing the recovery of crude oil and other subterranean organic materials. This has resulted in a great number of developments of recovery methods using various solvents for recovering crude oil from subterranean reservoirs and for liquefaction of solids such as coal, lignite and shale. There are many reservoirs or subterranean deposits which can yield useful substances but the recovery of which is limited by the cost of the recovery method. As a result, there is an ever present need to reduce the cost of hydrocarbon recovery methods while at the same time providing a method which will not have a detrimental effect on the field or reservoir in which the substances to be recovered are located.

Although a number of solvent recovery techniques and systems for recovering crude oil from underground deposits are known, the recovery and generation of fresh solvents has been a longstanding problem. Some types of solvents for recovering crude oil and the like are difficult to extract from the mixture of solvent and crude and require an input of energy for extraction which, together with the cost of reinjection and driving of the solvents, makes some fields uneconomical for further production even at rapidly escalating prices of oil.

In addition, known processes for liquefaction and extraction of coal using a hydrogenating agent which includes a solvent also require somewhat complex and energy-consuming solvent recovery processes.

SUMMARY OF THE INVENTION

It is therefore the principal object of the present invention to provide a novel and improved process and apparatus for recovering light ends from liquid hydrocarbons such as crude oil such that the recovered substances can be used as solvents for enhanced recovery of additional hydrocarbons trapped in subterranean deposits of various types.

It is another object of the present invention to provide improved apparatus which may include a storage tank or the like or modifications of existing tanks, which apparatus is simple in construction and yet effective in carrying out the improved process of the present invention.

It is a further object of the present invention to provide an improved process for generation of solvents for use in recovery of crude oil from reservoirs that have heretofore been uneconomical to produce.

It is an additional object of the present invention to provide a solvent extraction and generation process which may be useful in liquefaction of relatively deep deposits of coal and lignite which may not be recovered economically by conventional mechanical techniques or by heretofore known processes involving liquefaction and recovery by pumping the resultant liquid mixture to the surface.

In accordance with the present invention there is provided a method of extracting light ends from liquid hydrocarbons such as crude oil or the like which requires negligible energy input and takes advantage of natural chemical and physical properties of substances which can be easily used as solvents in enhanced recovery of crude oil and solid hydrocarbon yielding materials such as coal and lignite.

In accordance with one aspect of the present invention crude oil is retained in a conventional storage tank modified in accordance with the present invention whereby light ends such as alcohols and ethers are evaporated or boiled off and recovered under ambient temperature conditions for injection into a reservoir in either the gaseous or liquid form for recovery of crude oil and the like. In the present invention ambient air is drawn in through an improved inlet control structure adapted to be part of an oil storage tank. The air is circulated through crude oil or other liquid hydrocarbons in the tank to evaporate or boil the light ends such as ethers, alcohols and other aromatics having a boiling point at or below the ambient summertime temperatures that are experienced in many parts of the southern United States as well as other parts of the world that are sources of deposits of recoverable hydrocarbons. By circulating ambient air through the liquid hydrocarbons in a tank or the like container it is also possible to some extent to generate additional solvents by oxidation of certain hydrocarbons which may be present in the overall composition of the recovered substance.

The present invention provides two embodiments of a practical and unique structure for bubbling ambient air through liquid hydrocarbons in a storage tank to evaporate or boil off light ends which may be utilized as a solvent for injection into a subterranean oil field or coal deposit. In accordance with one embodiment of the present invention ambient air is drawn in through a stationary standpipe disposed in a bulk storage tank and the solvents evaporated or boiled within the tank are drawn off from the top of the tank through a conduit connected to suction means such as a compressor unit. The compressor may also be connected to an injection well for injection of the vaporized solvent in gaseous form into the well to provide a gas drive as well as an extraction solvent for recovery of crude oil. Morever, it is contemplated that the gaseous solvent recovered in accordance with the method and apparatus of the present invention may also be injected into an underground seam or deposit of solid material such as coal, lignite or even shale whereby, upon condensation, the solvent is useful in liquifying the material for recovery by conventional liquid pumping techniques.

In accordance with another embodiment of the present invention the level of oil in the storage tank from which the solvent is being extracted is not required to be maintained at a certain level and may be allowed to fluctuate while at the same time substantial circulation of ambient air through the liquid in the tank may be carried out for the solvent extraction process.

The present invention also provides an improved method of providing a gaseous or condensate recovery solvent for liquid as well as solid hydrocarbons which does not require expensive solvent recovery techniques since ambient air is being circulated due to the pressure differential created by a compressor or pump which must be provided for injection of the solvent into the injection wells. By utilizing ambient atmospheric air as the means of evaporating or boiling naturally occurring solvent substances out of recovery crude oil and recirculating these substances for use as a gaseous or liquid solvent or recovery agent considerable energy savings are provided.

In addition, the method and apparatus for extracting light ends from liquid hydrocarbons in accordance with the present invention provides processes for enhanced recovery of liquid hydrocarbons as well as liquefaction of solid hydrocarbon yielding substances which are economical and simplify the overall process of recirculation or recycling of a recovery solvent.

The process and apparatus of the present invention has many advantages over prior methods and apparatus for enhanced recovery of subterranean deposits of hydrocarbons. The process and apparatus of the present invention may be easily incorporated into known systems and methods for enhanced recovery and may be utilized by simple and inexpensive modification of existing equipment or the provision of improved apparatus in accordance with the teachings of the present invention.

THE DRAWINGS

Other objects and advantages of the present invention will be apparent upon reference to the accompanying description when taken in conjunction with the following drawings, which are exemplary, wherein;

FIG. 1 is a schematic diagram of the apparatus according to the present invention for extracting light ends from crude hydrocarbons in liquid form and illustrating an improved process for utilizing the extraction substances; and FIG. 2 is a sectional view in greater detail of a modification of a portion of the apparatus illustrated in FIG. 1.

DESCRIPTION OF THE PREFERRED EMBODIMENTS

Proceeding next to the drawings wherein like reference symbols indicate the same parts throughout the various views a specific embodiment and modifications of the present invention will be described in detail.

In the process of the present invention organic substances found to be naturally occurring in liquid hydrocarbons such as crude oil as well as in some instances resulting from the liquefaction of solid carbonaceous materials such as coal and lignite are generated by evaporation or boiling utilizing the circulation of ambient atmospheric air through a tank or vessel containing such liquid hydrocarbons. Most crude oil and some liquefied coals contain so-called light ends which are organic compounds identified generally as alcohols and ethers. These substances, which may evaporate or boil at the average ambient temperature found in many parts of the world, may be recovered or generated by a simple yet unobvious process utilizing further a novel modification of a storage tank or the like according to the present invention.

Figure 1:
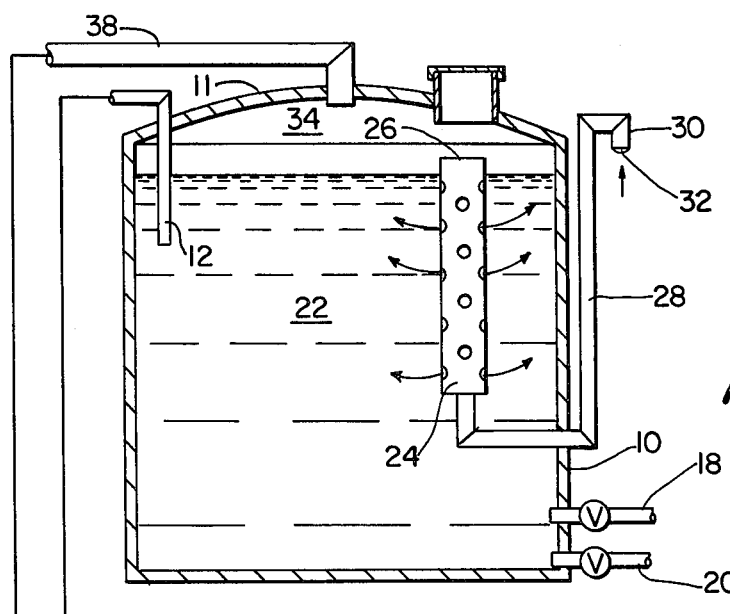

As may be seen in FIG. 1, there is illustrated a storage tank 10 which may be basically of conventional construction such as that found in many oilfields and tank batteries around oil production facilities. The tank 10 is a substantially closed container having a top wall 11 and a substantially cylindrical side wall upstanding from a bottom wall. There is an inlet pipe 12 for receiving crude oil or other liquified hydrocarbons pumped from a well or the like by way of a conduit 14 connected to a wellhead 16. For purposes of illustration certain components which may be typically used in processing crude oil or the like extracted from a well and known in the art have been omitted in the interest of clarity. The tank 10 further includes an outlet conduit 18 for drawing off crude oil from the tank for transportation and/or further processing. The tank 10 typically also includes a drain conduit 20 in the bottom portion of the side wall for removing all liquid from the tank, as needed, for repair or cleaning operations.

According to the present invention, the tank 10 includes means for introducing ambient air into the interior of the tank to be circulated through liquid hydrocarbons contained therein such as crude oil and the like and this means comprises a vertically extending tubular member 24 comprising a perforated hollow pipe or tube having a closed upper end 26. The perforated pipe 24 extends over a substantial portion of the vertical height of the tank 10. The pipe 24 is connected to an inlet pipe 28 projecting through the side wall of the tank and extending vertically upward along the outer vertical wall of the tank to an inverted inlet portion 30. The inlet portion 30 of the pipe 28 is of the updraft configuration to prevent natural precipitation from entering the pipe, and the portion 30 may be provided with a protective screen 32 as shown in FIG. 1.

The top wall or dome portion 11 of tank 10, under normal operation of the tank, provides an interior space or chamber 34 above the level of the liquid 22. A conduit 38 is connected to the top or apex of the dome portion 11 for drawing off vapors and gases present within the chamber 34. In accordance with the present invention, the conduit 38 is preferably connected to the suction port of a suitable compressor or pump means, generally designated at 40 in FIG. 1. In a preferred application of the present invention the pump or compressor 40 is suitably connected to a prime mover such as an internal combustion or diesel engine 42 illustrated schematically in FIG. 1. The compressor 40 includes a discharge line 44 which is connected to a well-head assembly 46 of a conventional injection well for injecting solvents and other recovery fluids in an enhanced recovery operation. If required, the system of the present invention may include a heat exchanger or condenser 48 for converting the fluid drawn from the chamber 34 and compressed by the compressor 40 from a gaseous to a liquid phase.

Accordingly, the present invention contemplates that enhanced recovery of crude oil and various coals from underground deposits may be carried out by a more economical process than has been heretofore known by utilizing solvents which are naturally occurring in the recovered organic liquids as a recovery fluid itself and wherein the production and separation of the solvent is accomplished by utilizing ambient atmospheric air injected into a tank containing a quantity of the recovered or extracted crude oil in a continous recycling and recovery process.

In operation, in the recovery of crude oil from reservoirs requiring a solvent and driving fluid injection, the system of the present invention would be started utlizing a tank substantially full of crude oil or a quantity of recoverable solvent. With the system illustrated in FIG. 1, upon starting the compressor 40, a reduction in pressure in the chamber 34 would cause air to be drawn in through the inlet pipe 28 and into the vertically disposed perforated tube 24 whereupon the air would bubble through the liquid 22 causing the evaporation of various compounds including the so called light ends such as some alcohols, ethers and aromatic hydrocarbons which are found naturally occurring in most crude oils. The quantity and variety of compounds vaporized would depend on the temperature of the air being drawn into the tank. For example, such compounds as isopropyl methyl ether, ethyl ether, and methyl propyl ether would be easily evaporated at temperatures found in the southern United States during most of the year as well as other known oil bearing areas such as the Middle East, Southeast Asia, and Mexico. The above mentioned compounds as well as certain aromatic hydrocarbons would be evaporated and drawn from the tank 10 by the compressor 40 along with the air drawn into the tank. Moreover, the severe agitation and mixing of liquid in the tank 10 with ambient atmospheric air drawn thereinto would also result in some oxidation of substances in the liquid to form further suitable solvents.

The solvents in vapor form drawn from the tank 10 are then compressed by the pump or compressor 40 and conducted to the injection well 46, which may be of conventional construction, for injection into the subterranean reservoir from which recovery of crude oil or the like is desired. As the crude oil recovered from the aforementioned deposit is driven into the recovery well 16 it may be pumped to the surface by conventional means, not shown, and through the conduit 14 into the tank 10. The level of the liquid 22 in the tank 10 would preferably be monitored and quantities of liquid would be drawn off through the conduit 18 to maintain a suitable level covering the perforations in the tube 24. Depending upon the operating conditions required for the field or reservoir being produced it might be necessary to condense the solvent being pumped by the compressor or pump 40 before injection into the well. In such cases the condensor 48 would be operated to condense at least a portion of the solvents before injection into the injection well 46. In a continuous recycling process of solvent as contemplated by the present invention the concentration of solvent in the quantity of liquid 22 within the tank 10 would increase over a period of time with the system illustrated in FIG. 1. However, the rate of withdrawal of liquid from the tank 10 may be controlled to regulate the concentration of solvent, an optimum concentration being considered to be about thirty percent of the liquid in the tank by volume.

The present invention is also suitable to be utilized in the recovery of deep coal deposits through liquefaction processes wherein the resultant liquid mixture of organic compounds brought to the surface from an underground deposit would be pumped to the tank 10 for recovery or generation of solvent for reinjection into the coal deposit. For example, U.S. Pat. No. 2,595,979 discloses a process for underground liquefaction of coal and lignite by a hydrogenating agent including free hydrogen or hydroaromatics such as hydrogenated naphthalenes, e.g., tetralin and decalin as well as hydroanthracenes. It is contemplated that a coal liquefaction process generally along the lines disclosed in the above mentioned patent may take advantage of the process of the present invention for recovering solvent materials from the liquid mixture of organic compounds withdrawn from the underground deposits by pumping the liquid to the tank 10 and bubbling ambient atmospheric air through the liquid within the tank to evaporate those solvent materials which would be capable of boiling under normal atmospheric temperature and to some extent the reduced pressure within the tank generated by the suction of the pump or compressor 40.

A process in accordance with U.S. Pat. No. 2,595,979 and further utilizing the solvent generation and recovery system of the present invention could be easily combined. For example, additional hydrogen or hydrogenating agents could be injected into the solvent discharge line 44 before injection of the solvent solution into the injection well. In adapting the system illustrated in FIG. 1 of the drawings to an underground liquefaction process such as disclosed in the above mentioned patent a single well of the type described in the patent would be utilized instead of the typical injection and recovery well system utilized for recovery of crude oil.

Figure 2:
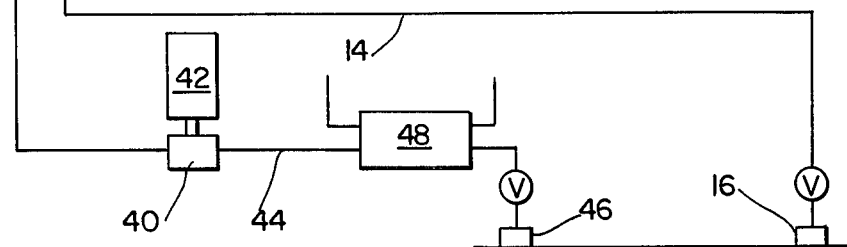
Figure 2:
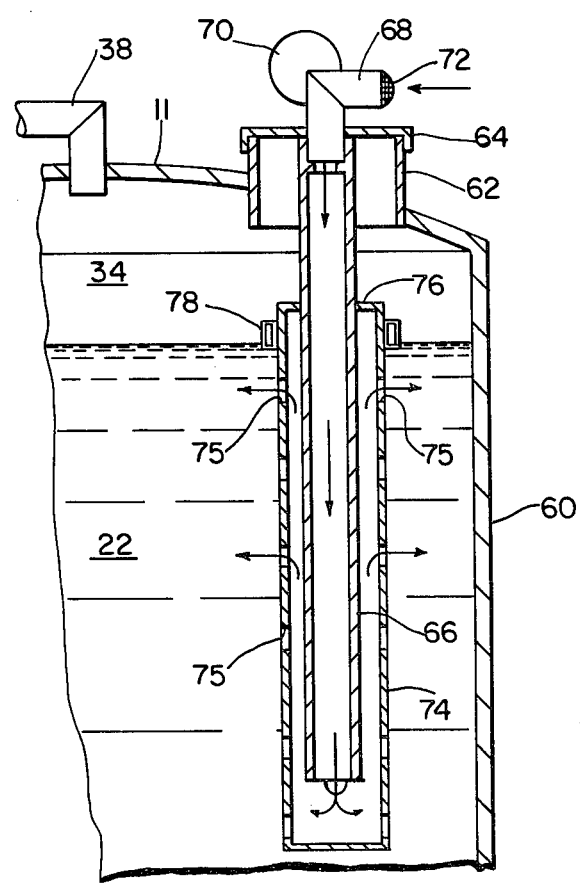

Referring to FIG. 2 of the drawings, another embodiment of a tank is illustrated for use in conjunction with the system and method of recovery of organic liquids from underground deposits. Although the arrangement of the pipes 24 and 28 illustrated in FIG. 1 could be modified in various ways, for example such as by a network of pipes disposed generally horizontally along the bottom of the tank, the arrangement illustrated in FIG. 2 is believed to be economical to install in conventional tanks and is particularly advantageous in that it will accommodate variations in the level of liquid within the tank.

In accordance with the structure in FIG. 2, a typical storage tank 60, not unlike the tank 10, includes a gaging port 62, the cover of which has been removed and replaced by a cover 64 to which is attached an elongated vertically disposed tubular member 66 extending downwardly into the interior of the tank. The tube 66 includes an inlet duct portion 68 formed as swivelly mounted right angle portion or elbow adapted to be disposed within the upper end of the tube 66 and including a wind vane or rudder 70 for pivoting the inlet duct to face the prevailing wind. The elbow 68 includes an inlet opening covered by a suitable screen 72. As shown in FIG. 2, an elongated perforated tubular member 74 is disposed in telescoping spaced relationship to surround the tube 66 and includes a transverse endwall 76 having a bore therein only slightly larger than the outer diameter of the tube 66 and adapted to be in slidable close fitting relationship to the tube 66. The upper end of the tube 74 also includes an annular flotation collar 78 adapted to float in the liquid 22 within the tank so that the tube portion 74 rises and falls in accordance with a change in liquid level within the tank 60. In this way, the perforations 75 in the side walls of the tube 74 are normally always submerged even though the liquid level in the tank 60 may vary over a considerable range.

The apparatus illustrated in FIG. 2 may be easily adapted to many existing tanks in place in existing oil fields which may now be suitable for tertiary recovery utilizing the method of the present invention. The gaging or inspecting port cover of existing tanks may be replaced with the apparatus disclosed in FIG. 2 whereby such tanks may be converted for generation and extraction of solvent for use with the system of the present invention. As shown in FIG. 2, the tank 60 would also include the outlet conduit 38 for drawing off solvent in vapor form generated by bubbling ambient atmospheric air through the liquid 22 as said air was drawn in through the inlet duct 68 and down through the tube 66 to be bubbled out through the openings 75.

Accordingly, not only does the present invention contemplate a low cost and energy efficient solvent generation and recovery apparatus and system for enhanced recovery of underground deposits of organic materials, but such a process and system may be easily installed using conventional apparatus found in many processes and systems for recovery of underground deposits of hydrocarbons or systems which have been previously contemplated.

It will be understood that this invention is susceptible to modifications in order to adapt it to different usages and conditions, and accordingly, it is desired to comprehend such modifications within this invention as may fall within the scope of the appended claims.

It is claimed:

1. In a process for the extraction of a solvent from a liquid mixture of organic compound recovered from a subterranean deposit, the steps of retaining in a closed container a quantity of a liquid mixture or organic compounds recovered from a subterranean deposit, circulating ambient atmospheric air through the liquid mixture to vaporize solvent compounds therein, collecting the vaporized solvent compounds in a chamber with the closed container, drawing off from the chamber the vaporized solvent compounds which are adapted for injection into a subterranean deposit to recover liquid and solid hydrocarbons, injecting the recovered solvent compounds into a subterranean deposit to recover liquid hydrocarbons, and conducting the liquid mixture recovered by the solvent to the closed container.

2. In a process as claimed as claimed in claim 1 and the step of removing the liquid mixture from the closed container at a rate sufficient to maintain a predetermined concentration of solvent in the liquid mixture remaining the closed container.

3. In a process of claimed in claim 2 wherein the maximum concentration of solvent maintained in the liquid mixture is approximately thirty percent (30%) of the liquid mixture by volume.

4. In an apparatus for the generation of a solvent from a liquid mixture of organic compounds recovered from a subterranean deposit, a closed container for retaining a quantity of a liquid mixture of organic compounds and having inlet and outlet means for the liquid mixture, there being a chamber defined in said closed container above the liquid mixture contained therein, a first passage communicating with said chamber through which solvent vapor collected in said chamber can be drawn off, and means connected to a source of ambient atmospheric air for circulating ambient atmospheric air within the liquid mixture in said closed container, said circulating means comprises a vertically disposed perforated pipe within said closed container, said pipe having a closed upper end and a lower end connected to the source of ambient atmospheric air.

5. In an apparatus as claimed in claim 4 wherein said circulating means comprises a vertically disposed fixed inlet first tubular member extending downwardly into said closed container, and a second tubular member surrounding said first tubular member in spaced relation thereto and having at least one opening therein.

6. In an apparatus as claimed in claim 5 wherein said second tubular member is moveably mounted on said first tubular member and has means thereon for maintaining said second tubular member at a predetermined position within said closed container with respect to the level of the liquid mixture therein whereby said outlet opening is maintained submerged in said liquid mixture.

7. In an apparatus as claimed in claim 6 wherein said level maintaining means comprises floatation means attached to said second tubular member.

8. In an apparatus as claimed in claim 7 wherein there is a port in a wall of said closed container and a cover closing said port, said fixed inlet first tubular member being supported from said port cover, said port being of such a size to enable said first tubular member, said second tubular member and said floatation means to be installed within said closed container through said port.

9. In an apparatus as claimed in claim 4 and further comprising a compressor having an inlet port connected to said first passage and a discharge port in flow communication with an injection well.

10. In an apparatus as claimed in claim 9 wherein said inlet means of said closed container is connected in flow communication with a recovery line to conduct a liquid mixture recovered from a subterranean deposit into said closed container.

* * * * *